(12) United States Patent
Kim

(10) Patent No.: US 6,466,292 B1
(45) Date of Patent: Oct. 15, 2002

(54) DUAL SIDED LIQUID CRYSTAL DISPLAY DEVICE AND MOBILE TELECOMMUNICATION TERMINAL USING THE SAME

(75) Inventor: Hong Joo Kim, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/596,559

(22) Filed: Jun. 19, 2000

(30) Foreign Application Priority Data

Jun. 17, 1999 (KR) .............................. 99-22782

(51) Int. Cl.[7] ..................... G02F 1/1343; G02F 1/1335; H04B 1/38
(52) U.S. Cl. ..................... 349/143; 349/16; 349/113; 455/566
(58) Field of Search ..................... 349/143, 16, 113; 353/20; 455/566, 556, 557, 575

(56) References Cited

U.S. PATENT DOCUMENTS 5,115,228 A  *  5/1992  Harris et al. ................. 345/5
5,896,575 A  *  4/1999  Higginbotham et al. .... 455/556
6,132,048 A  * 10/2000  Gao et al. ..................... 353/20

* cited by examiner

*Primary Examiner*—William L. Sikes
*Assistant Examiner*—Tarifur R. Chowdhury
(74) *Attorney, Agent, or Firm*—McKenna Long & Aldridge LLP

(57) ABSTRACT

A liquid crystal display device and a mobile telecommunication terminal using the same can display messages such as information on a calling party, a received message, and temporal information even when a folding cover is not open by using a double-faced liquid crystal display device. The double-faced liquid crystal display device includes a first substrate having a common electrode, a second substrate having n scan electrodes and m signal electrodes, a liquid crystal layer disposed between the first and second substrates, a polarizer, and a reflector, wherein the liquid crystal display device is divided into a first region and a second region, and the polarizer and the reflector are symmetrically disposed so that the first region is displayed in a first direction and the second region is displayed in a second direction.

5 Claims, 3 Drawing Sheets

DUAL SIDED LIQUID CRYSTAL DISPLAY DEVICE AND MOBILE TELECOMMUNICATION TERMINAL USING THE SAME

CROSS REFERENCES TO RELATED APPLICATIONS

This application claims the benefit of Korean Patent Application No. 22782/1999, filed on Jun. 17, 1999, the entirety of which is hereby incorporated by reference for all purposes as if fully set forth herein

BACKGROUND OF THE INVENTION

1. Field of the Invention

The present invention relates to a double-faced liquid crystal display device and a mobile telecommunication terminal using the same.

2. Description of the Related Art

A related art liquid crystal display device will be described with reference to the accompanying drawings.

FIG. 1 is a sectional view showing a related art liquid crystal display device, and FIG. 2 is a schematic view showing a double-faced display device based on the related art liquid crystal display device.

As shown in FIG. 1, the related art liquid crystal display device includes a lower substrate 13, an upper substrate 12, and a liquid crystal 14. The lower substrate 13 includes a scan electrode pattern, a signal electrode pattern, and a pixel electrode pattern. The upper substrate 12 includes a common electrode pattern, a black matrix, and a color filter layer. The liquid crystal 14 is implanted between the upper substrate 12 and the lower substrate 13.

Polarizers 11 and 15 are respectively disposed on the upper substrate 12 and below the lower substrate 13 to compensate a phase difference due to refraction of light when characters, numbers or figures are displayed. A reflector 16 is disposed on the bottom of the polarizer 15 to reflect light.

The upper substrate 12 and the lower substrate 13 between which the liquid crystal 14 is implanted are formed of glasses or films having excellent transmittivity of light. The electrode patterns formed in the upper substrate 12 and the lower substrate 13 may be of dot matrix types, segment types, or a mix of dot matrix and segment types.

In some applications, it is desirable to provide a double-faced display; that is, a display that can be viewed from two faces, or surfaces. One example of such an application is a folding cover type mobile telecommunicative terminal such as a cellular telephone. In this type of application, it is desirable to have a double-faced display with one display viewable on the inside of the folding cover for displaying information when the phone is in use by a user, and a second display viewable on the outside of the cover, which allows information such as caller identification information to be displayed to a user without requiring the user to open the phone.

The construction of a related art double-faced display device for displaying characters, numbers and/or figures on two faces using two conventional liquid crystal display devices of the type discussed above will now be described.

As shown in FIG. 2, the related art double-faced display device includes first and second liquid crystal display devices 26a and 26b having respectively, signal electrodes and scan electrodes, a controller 21 for analyzing an input video signal and outputting a control signal for displaying characters, numbers or figures, a first memory 22 comprising a volatile memory device, for temporarily storing an input signal and storing booted data to promptly process the operation of the controller 21, a second memory 23 comprising a nonvolatile memory device, for storing an operational algorithm of the controller 21, a first driver 24a for driving the signal electrodes and the scan electrodes of the first liquid crystal display device 26a in accordance with a control signal of the controller 21 to display a video signal, a second driver 24b for driving the signal electrodes and the scan electrodes of the second liquid crystal display device 26b in accordance with the control signal of the controller 21 to display a video signal, and first and second frame memories 25a and 25b for storing signals for displaying characters, numbers or figures, applied from the first and second drivers 24a and 24b.

In other words, in a conventional double-faced display, there are provided two liquid crystal display devices having separate signal electrodes and scan electrodes, and two drivers for, respectively, the two liquid crystal display devices.

The operation of the conventional double-faced display device, in which one liquid crystal display device is attached on a front face and a second liquid crystal display device is attached on a rear face, will now be described.

When power is supplied to the system, the controller 21 accesses an operation program stored in the second memory 23 and detects the signals for displaying externally input characters, numbers or figures in a state that the system is initially booted.

At this time, if the externally input signals are detected, the controller 21 analyzes the input signals through the operational algorithm and analysis program set in the first and second memories 22 and 23 and applies the control signal for displaying characters, numbers or figures to the first and second drivers 24a and 24b.

The first and second drivers 24a and 24b apply a driving signal for displaying corresponding characters, numbers or figures to the scan electrodes and the signal electrodes of the first and second liquid crystal display devices 26a and 26b attached on inner and outer surfaces of the system for double-faced display, so that the same characters, number or figures can respectively be displayed on the first and second liquid crystal display devices 26a and 26b.

At this time, the first and second frame memories 25a and 25b process and store the control signal applied from the controller 21 for a frame. Then, the first and second frame memories 25a and 25b output the frame signal stored in corresponding memory areas in accordance with access signals of the first and second drivers 24a and 24b, so that corresponding characters, numbers or figures can stably be displayed on the first and second liquid crystal display devices 26a and 26b.

However, the related art double-faced display device has several drawbacks.

First, to display characters, numbers or figures on two faces, two liquid crystal display devices must separately be provided. To drive the two liquid crystal display devices, two drivers corresponding to the two liquid crystal display devices must be provided. To simultaneously display two faces, a duplicated control algorithm is used. This increases power consumption and thus increases the production cost.

Furthermore, since the two drivers are provided to drive the two liquid crystal display devices, a large area is required in the system. This makes it difficult to produce a light-weight and slim-sized product. For example, in a folding cover type mobile telecommunication terminal, in order to display identification information for a calling party without opening the folding cover, two liquid crystal display devices must be provided, one attached on an inner face of the cover and the other on the outer face of the cover. This makes a light-weight and slim-sized folding cover type mobile telecommunication terminal difficult. Also, since the expensive liquid crystal display devices and drivers are additionally provided, the cost of the terminal increases.

SUMMARY OF THE INVENTION

Accordingly, the present invention is directed to a liquid crystal display device and a mobile telecommunication terminal using the same that substantially obviates one or more of the limitations and disadvantages of the related art.

An object of the present invention is to provide a double faced liquid crystal display device and a mobile telecommunication terminal using the same, in which one liquid crystal display device displays information on two faces so that messages such as caller identification information, a received message, and temporal (e.g., time and date) information can be displayed even when a folding cover is not open.

Another object of the present invention is to provide a liquid crystal display device and a mobile telecommunication terminal using the same, in which production costs can be saved and a slim-sized and light-weight mobile telecommunication terminal can be achieved.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages in accordance with the present invention, as embodied and broadly described herein, a liquid crystal display device according to the present invention includes a first substrate having a common electrode, a second substrate having n scan electrodes and m signal electrodes, a liquid crystal layer disposed between the first and second substrates, a polarizer, and a reflector, wherein the liquid crystal display device is divided into a first region and a second region, and the polarizer and the reflector are symmetrically disposed so that the first region is displayed in a first direction and the second region is displayed in a second direction.

In another aspect, a liquid crystal display device includes a first substrate, a second substrate disposed below the first substrate, a liquid crystal layer disposed between the first substrate and the second substrate, a first front polarizer disposed above and extending over a first portion of the first substrate, a first rear polarizer disposed above and extending over a second portion of the first substrate, a first reflector disposed above the rear polarizer and extending over the second portion of the first substrate, a second rear polarizer disposed below and extending under a first portion of the second substrate, a second reflector disposed below the second rear polarizer and extending under the first portion of the second substrate, and a second front polarizer disposed below and extending under a second portion of the second substrate.

In other aspect, a mobile telecommunication terminal includes a folding cover movable between an open position and a closed position, having a window in a predetermined area, a liquid crystal display device having a first region and a second region, the first and second regions being displayed to oppose each other, and the liquid crystal display device being mounted an inner side of the folder cover to externally display the second region through the window, and a driver for driving the liquid crystal display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to preferred embodiments of the present invention, examples of which are illustrated in the accompanying drawings.

Figure 1:
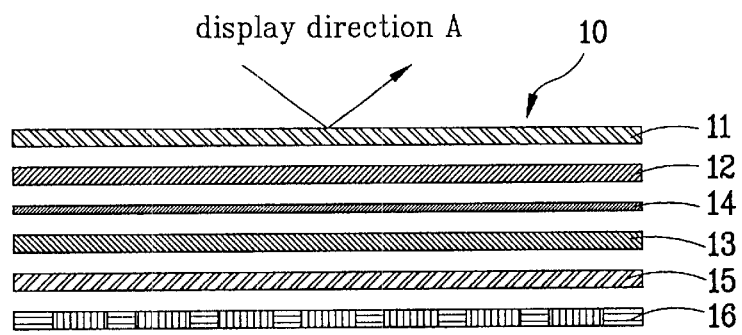
FIG. 1 is a sectional view showing a related art liquid crystal display device.
Figure 2:
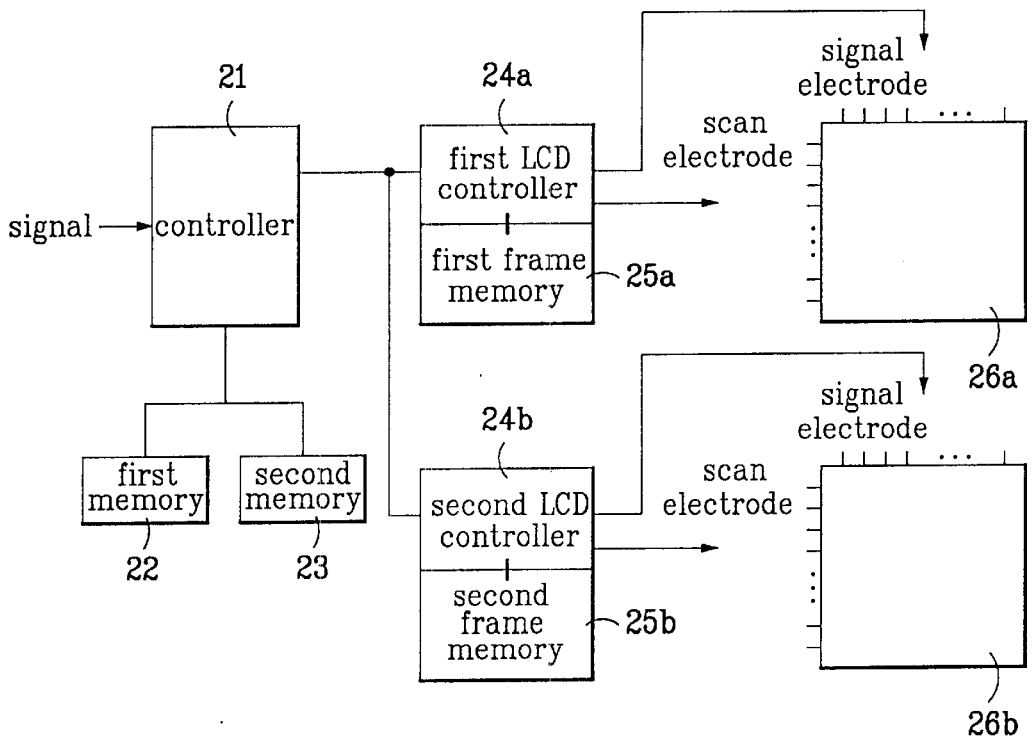
FIG. 2 is a schematic view showing a double-faced display device based on the related art liquid crystal display device.
Figure 3:
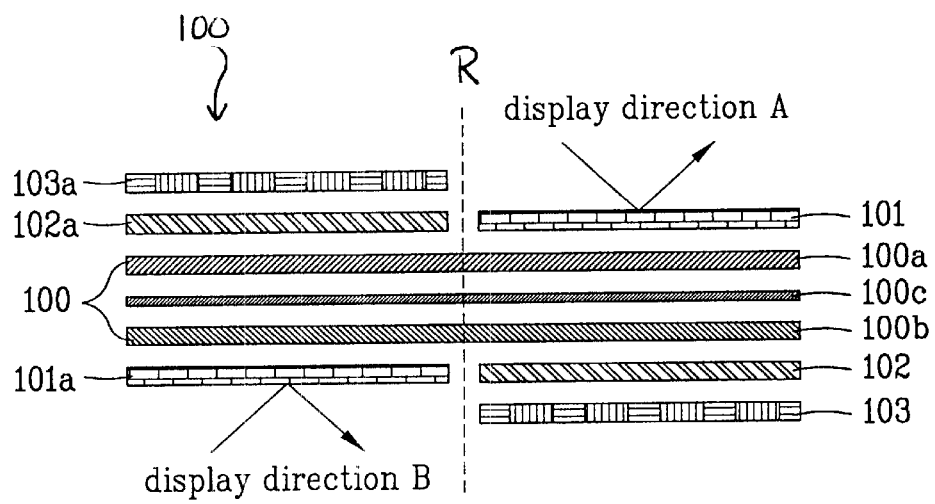
FIG. 3 is a sectional view showing a double-faced liquid crystal display device according to one embodiment of the present invention.

As shown in FIG. 3, a liquid crystal display device 100 includes a lower substrate 100b, an upper substrate 100a, and a liquid crystal layer 100c. A scan electrode pattern, a signal electrode pattern, and a pixel electrode pattern are formed in the lower substrate 100b, and an origination layer is formed on the above patterns. A common electrode pattern and a color filter layer are formed in the upper substrate 100a. The liquid crystal layer 100c is implanted into an aperture between the upper substrate 100a and the lower substrate 100b.

The liquid crystal layer has a first switching state in which the phase of light is changed while passing through it and a second switching state in which the phase of light is not changed while passing through it.

The liquid crystal display device 100 is divided into a first region A and a second region B at a predetermined ratio by setting a reference line R so that characters, numbers or figures are displayed in direction A and direction B.

When the liquid crystal display device is divided into the first region A and the second region B, the first and second regions A and B commonly include m signal lines, the first region includes $1^{st}$ to kth scan electrodes of the n scan electrodes, and the second region includes (k+1)th to nth scan electrodes of the n scan electrodes. Alternatively, the first region A and the second region B may commonly include n scan electrodes, the first region may include $1^{st}$ to kth signal lines of the m signal lines, and the second region may include (k+1)th to mth signal lines of the m signal lines. The first region is greater than the second region.

To compensate a phase difference due to refraction of light when characters, numbers or figures are displayed, a first front polarizer 101 and a second rear polarizer 102 are respectively disposed on and below the first region A of the liquid crystal display device 100. To reflect light generated in the liquid crystal in direction A, a second reflector 103 is disposed below the second rear polarizer 102.

Also, in the liquid crystal display device 100 divided through the reference line R, a first rear polarizer 102a and a second front polarizer 101a are respectively disposed on and below the second region B to compensate the phase difference generated by refraction of light when characters, numbers or figures are displayed. A second reflector 103a is disposed on the first rear polarizer 102a.

In other words, the first front polarizer 101 is substantially aligned with the second rear polarizer 102 and the second reflector 103. The second front polarizer 101a is substantially aligned with the first rear polarizer 102a and the first reflector 103a.

The electrode patterns of the liquid crystal display device 100 may have a dot matrix structure, a segment structure, or a mix of the dot matrix and segment structures.

In the case where the double faced liquid crystal display device divided around the reference line R is mounted into a folding cover of a mobile telecommunication terminal, the first region A of the liquid crystal display device is viewable on an inner surface of the folding cover and acts as a main screen while the second region B is viewable on an outer surface of the folding cover and acts as a sub screen. A detailed state of the liquid crystal display device will be described with reference to FIGS. 5 and 6.

Figure 5:
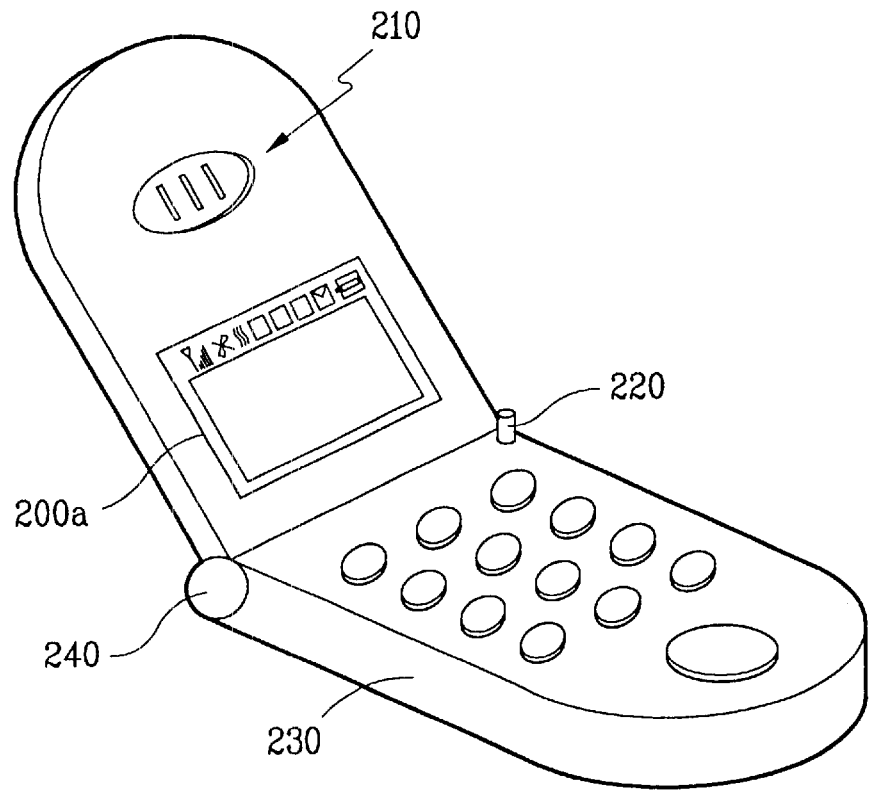
FIG. 5 is a schematic view showing a display device of a mobile telecommunication terminal when a folding cover is open, according to an. embodiment of the present invention.
Figure 6:
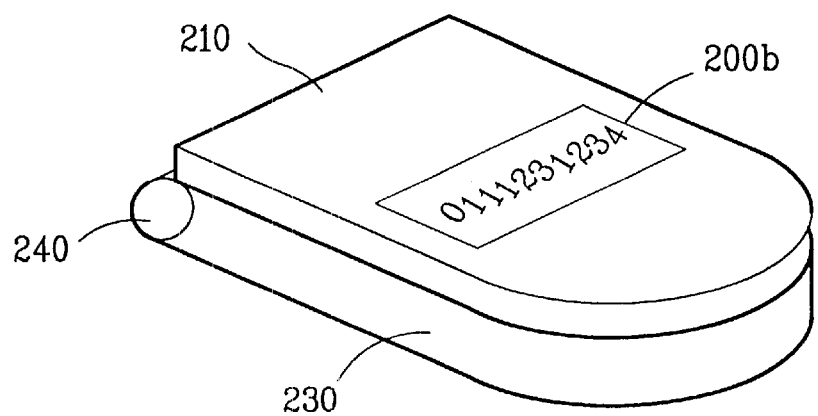
FIG. 6 is a schematic view showing the display device of FIG. 5 when the folding cover is closed.

FIG. 5 is a schematic view showing a display device of the mobile telecommunication terminal when the folding cover is open, according to the present invention, and FIG. 6 is a schematic view showing a display device of the mobile telecommunication terminal when the folding cover is closed, according to the present invention.

As shown in FIG. 5, the mobile telecommunication terminal includes a main body 230 and a folding cover 210. The main body 230 and the folding cover 210 are connected with each other by a hinge 240. A switch 220 is provided in the main body 230 to detect the open and closed states of the folding cover 210. The first region A of the liquid crystal display device is displayed on the inner surface of the folder cover 210 as a main screen 200a while the second region B thereof is displayed on the outer surface of the folding cover 210 as a sub screen 200b.

Figure 4:
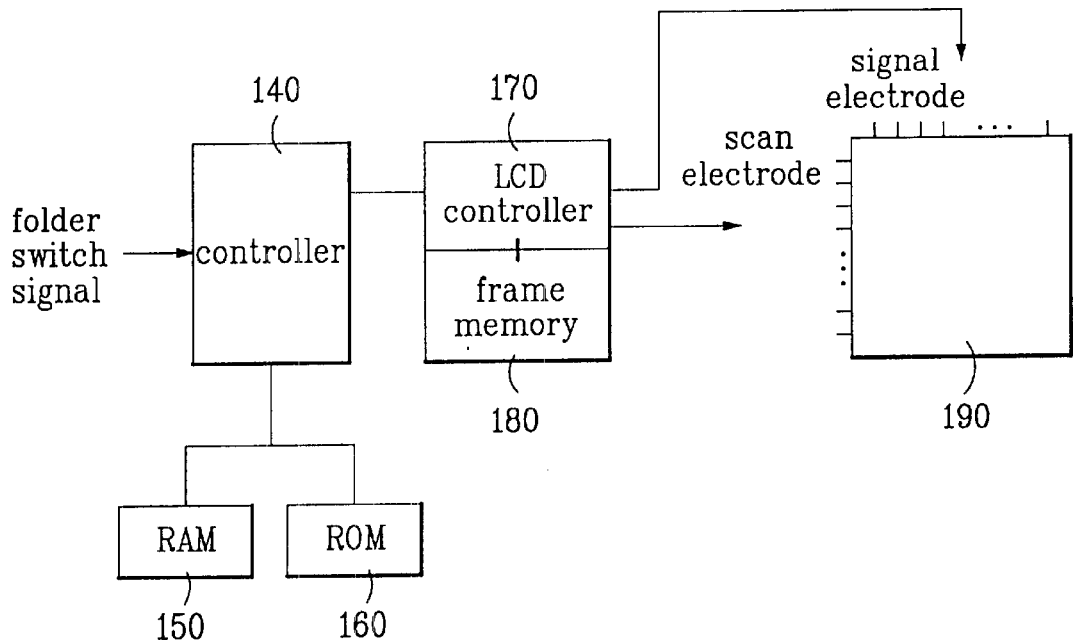
FIG. 4 is a block diagram showing a double-faced liquid crystal display device of a mobile telecommunication terminal according to the present invention.

The system for driving a display device of the mobile telecommunication terminal according to the present invention will be described with reference to FIG. 4. As shown in FIG. 4, the display device of the mobile telecommunication terminal includes a controller 140, a RAM 150, ROM 160, an LCD controller 170, a frame memory 180, and a liquid crystal display device 190 divided into the two regions as described above.

The controller 140 controls the overall operation of the liquid crystal display device 190. Particularly, as shown in FIG. 5, the controller 140 activates the first region A viewable on the inner surface of the folding cover 210 in accordance with a signal from the switch 220, which is switched by the open and closed state of the folding cover 120. Alternatively, as shown in FIG. 6, the controller 140 activates the second region B viewable on the outer surface of the folder cover 210 to provide information on a calling party, including a calling party's name and the like, in case of a termination signal, and possibly other information such as current time and/or battery status.

The RAM 150 acts as a volatile memory device and temporarily stores input signals or boot data so that the processing operation of the controller 140 can promptly be performed. The ROM 160 acts as a nonvolatile memory device and stores the overall operational algorithm of the controller 140.

The LCD controller 170 controls the driving of the m signal electrodes and the n scan electrodes in accordance with the control signal applied to display characters, numbers or figures, so that the first region and the second region on the inner and outer surfaces of the folder cover 210 are selectively displayed.

In other words, in case where the first region and the second region commonly include the m signal lines, the first region includes $1^{st}$ to kth scan electrodes of the n scan electrodes, and the second region includes (k+1)th to nth scan electrodes of the n scan electrodes, the controller 140 controls the LCD controller 170 to display the first region of the liquid crystal display device if it is determined by the folder switch 220 that the folding cover 210 is opened. Accordingly, the LCD controller 170 applies the driving signal to the signal line and the scan line within the limits of the $1^{st}$ to kth scan electrodes of the n scan electrodes, so that the first region is only displayed. By contrast, if it is determined by the folder switch 220 that the folding cover 210 is closed, the controller 140 controls the LCD controller 170 to display only the second region. Accordingly, the LCD controller 170 applies the driving signal to the (k+1)th to nth scan electrodes.

The frame memory 110 processes the applied signal for controlling display for the unit of frame so that corresponding characters, numbers or figures can stably be displayed.

As aforementioned, the operation of the liquid crystal display device of the present invention applied to the mobile telecommunication terminal as shown in FIGS. 5 and 6 will be described.

In a state that the power is supplied to the mobile telecommunication terminal, if a system-on signal is detected, the controller 140 analyzes the signal from the folder switch 220 switched in accordance with open and closed state of the folding cover 210 which is opened or closed around a shaft of the hinge 240.

If it is recognized by the signal of the folder switch 220 that the folding cover 210 is closed, the controller 140 determines that the overall information is to be displayed through the second region B, and applies the control signal to the LCD controller 170.

At this time, the LCD controller 170 displays information on a calling party's phone number, a received character message, current time, battery status and the like through the second region B in accordance with the control signal.

Thereafter, in a state that the over all information of the mobile telecommunication terminal is displayed through the sub screen 200b viewable on the outer surface of the folding cover 210, if the open signal of the folding cover 210 is detected by the controller 140 through the folder switch 220, the controller 140 applies the control signal for displaying the first region A to the LCD controller 170. The controller 140 activates the main screen 200a on the inner surface of the folder cover 210 by appropriately selecting a contact point of the scan electrode and the signal electrode, and at the same time inactivates the sub screen 200b.

As aforementioned, the liquid crystal display device having a double-faced display function has the following advantages. Since one liquid crystal display device is divided into two regions, i.e., first and second regions, and one driver dives the first region in a front direction and the second region in a rear direction, the double faced display device is realized without two separate liquid crystal display devices, thereby effectively using a limited area. This achieves a light-weight and slim-sized mobile telecommunication terminal.

Furthermore, the double-faced liquid crystal display device is applied to the folder of the mobile telecommunication terminal so that information on a calling's party, a received message, current time, and the like can be displayed even when the folding cover is closed. Accordingly, information to be displayed can be viewed even when the folding cover is not open.

Still further, since the liquid crystal display device having a double-faced display can be driven by one driver, power consumption can be reduced. In addition, in case where the liquid crystal display device is applied to the mobile telecommunication terminal, it is possible to increase the useable time of the mobile telecommunication terminal by one time charge.

It will be apparent to those skilled in the art that various modifications and variations can be made in the liquid crystal display device and the mobile telecommunication terminal using the same according to the present invention without departing from the spirit or scope of the invention. Thus, it is intended that the present invention covers the modifications and variations of the invention provided they come within the scope of the appended claims and their equivalents.

What is claimed is:

1. A mobile telecommunication terminal, comprising:

a folding cover attached to a base and movable between an open position and a closed position, the folding cover having an inner surface and an opposed exterior surface, wherein the inner surface is adjacent the base when the folding cover is in the closed position;

a liquid crystal display device in the folding cover, the liquid crystal display having a first viewable region and a nonoverlapping, contiguous second viewable region, wherein the first viewable region is viewable when the folding cover is in the open position but not when the folding cover is in the closed position; wherein the second viewable region is viewable when the folding cover is in the closed position; wherein a first front polarizer and a first rear mirror sandwich the first viewable region; and wherein a second front polarizer and a second rear mirror sandwich the second viewable region; and a driver for driving the liquid crystal display device.

2. The mobile telecommunication terminal as claimed in claim 1, further comprising a folder switch for detecting open and closed states of the folding cover, and a controller for controlling the driver to selectively produce an image in either the first viewable region or in the second viewable region in accord with the state of the folder switch.

3. The mobile telecommunication terminal as claimed in claim 2, wherein the controller selectively produces an image in the first viewable region when the folder cover is open.

4. The mobile telecommunication terminal as claimed in claim 2, wherein the controller selectively produces an image in the second viewable region when the folder cover is closed.

5. A mobile telecommunication terminal according to claim 1, wherein the liquid crystal display device further includes:

a first substrate having a common electrode;

a second substrate having n scan electrodes and m signal electrodes; and a liquid crystal layer disposed between the first and second substrates.

* * * * *